Jan. 5, 1965
H. SCHENKER ETAL
3,164,716
METHOD OF EXPOSING INSULATED CONDUCTORS
Filed Jan. 16, 1961
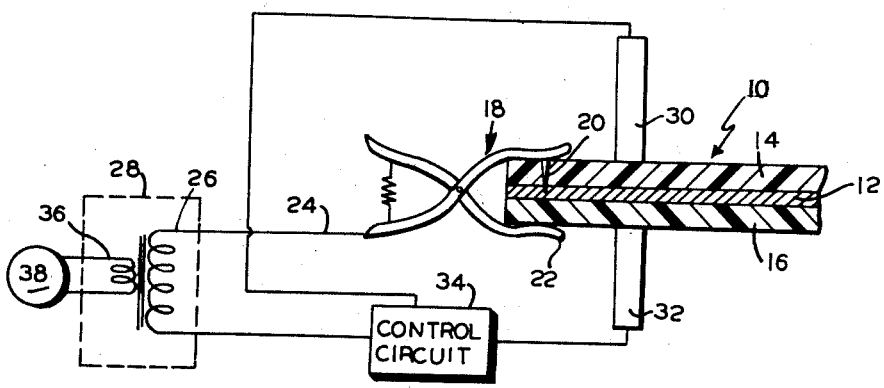
FIG.1
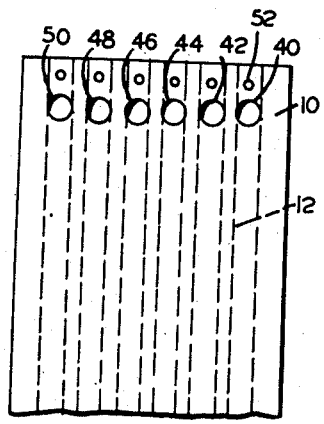
FIG.2
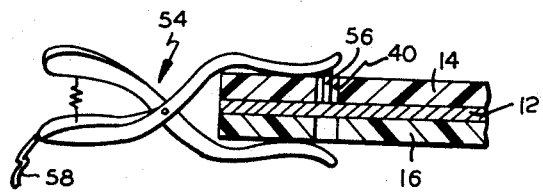
FIG.3
*INVENTORS*
HENRY SCHENKER
HANS GRAICHEN
BY
ATTORNEY

United States Patent Office 3,164,716
Patented Jan. 5, 1965

3,164,716
METHOD OF EXPOSING INSULATED
CONDUCTORS
Henry Schenker and Hans Graichen, Norwalk, Conn.,
assignors to Burndy Corporation, a corporation of New
York
Filed Jan. 16, 1961, Ser. No. 83,064
1 Claim. (Cl. 219—383)

Our invention relates to a method of exposing an insulated electrical conductor for establishing an electrical connection therewith.

The problem of stripping an insulated conductor for this purpose has been complicated by the introduction of flat cable harnesses which may consist of etched patterns of spaced apart copper conductors permanently bonded between insulating layers. The conductors are almost foil-like in thickness and make the stripping of the insulation an uncertain and difficult operation. Hitherto, such methods employed abrasive wheels and cutting knives requiring sharp tools and technical skill.

The present invention has for its object the development of a new method of stripping which eliminates the uncertainties and dangers of the earlier methods.

We accomplish the foregoing object by the use of a high voltage circuit with sufficient current to initiate and sustain an arc between the conductors in the flat cable and an electrode adjacent thereto to remove the insulation therebetween over a sufficient area of the conductor to permit an efficient connection therethrough.

These and other objects of our invention are accomplished and new results obtained as will be apparent from the device described in the following specification, particularly pointed out in the claim, and illustrated in the accompanying drawing in which:

FIG. 1 is a diagrammatic circuit including one end of a flat cable showing the arrangement of parts for stripping the insulated conductor which is shown in an edge section;

FIG. 2 is a plan view of a terminal portion of the flat insulated cable showing the stripped areas in one insulation area; and FIG. 3 is a sectional view of a terminal connector for making a terminal connection with any selected conductor or group of conductors.

Our circuit may, as shown in FIG. 1, comprise a flat cable 10 having a thin ribbon conductor 12 contained therein covered by insulation layers 14 and 16, to which is affixed, at one end thereof, a toothed clamping device 18, the needle tooth 20 of which has mechanically pierced the insulation layer 14 to make electrical contact with the conductor 12. The clamping device may be similar to an alligator clip with its flat nose 22 supporting the insulation layer 16 directly beneath the needle tooth 20.

The electrical conductor 24 connects the clamp 18 to the high voltage secondary winding 26 of the transformer 28. The secondary winding circuit continues to the electrodes 30 and 32 which are connected in parallel, with the circuit controller 34 positioned between the secondary and the electrodes. Circuit controller 34 may provide a voltage regulation function, and will also sequentially energize first one electrode, e.g. 30, whereby the high electric potential between the conductor 12 and the electrode 30 causes a breakdown of the insulation in the area therebetween and permits the heat produced by the current to flow in a controlled fashion to remove the insulation; and then energizes the other electrode, e.g., 32. If only one hole on one side of the cable is desired, only one electrode need be connected. The transformer primary 36 is connected to the A.C. current source 38, to energize the circuit.

It may be noted that the electrodes may be either solid, or of thin wall tubular construction. While a simple transformer circuit has been illustrated, it will be realized that the circuit might be modified, with storage capacitors if desired, to utilize D.C.

In a test made using flat copper conductors having a width of .094 inch and a thickness of .006 inch, with insulation made of "Mylar," having a thickness of .006 above and below the flat conductor, the circuit was subjected to 6 kv., 60 c.p.s. between insulation surface and inner conductor. A circular hole 40 of .075 inch in diameter was produced in the insulation 14 directly under electrode 30 of .058 inch in diameter, when the circuit controller 34 was activated, causing a current flow for about 1.0 second. The electrode is about the width of the conductor and produces a hole in the insulation of a similar width.

For producing the remaining insulator stripped terminal contacting holes 42 to 50 respectively, the operation is sequentially repeated transversely with respect to the cable 10. Note that the punctures produced by the needle tooth clamp are indicated as 52.

The circuit details, voltage, current, time cycles, etc., all depend on the specific tape characteristics.

In the foregoing, we have disclosed in detail, a specific method and means for stripping the insulation adjacent a specific conductor for making electrical contact therewith. As seen in FIG. 3 the electric terminal 54 may employ a construction similar to the clamp 18, with a contact 56 of a size slightly smaller than the stripped hole 40, for transmitting the conductor current to the lead 58.

We have thus described our invention, but we desire it understood that it is not confined to the particular forms or uses shown and described, the same being merely illustrative, and that the invention may be carried out in other ways without departing from the spirit of our invention, and, therefore, we claim broadly the right to employ all equivalent instrumentalities coming within the scope of the appended claim, and by means of which, objects of our invention are attained and new results accomplished, as it is obvious that the particular embodiments herein shown and described are only some of the many that can be employed to attain these objects and accomplish these results.

We claim:

The method of stripping synthetic plastic insulation from a portion of a conductor in a flat cable, which comprises: positioning an electrode on the insulation of the conductor at the portion to be stripped; applying an insulation piercing contact to the flat cable to electrically engage the conductor to be stripped; and thereafter passing a high voltage current between the contact and the electrode producing a high voltage flashover causing the insulation to be stripped from the conductor in the area underneath the electrode.

References Cited in the file of this patent

UNITED STATES PATENTS

| | | | |
|---|---|---|---|
| 717,778 | Spaulding | Jan. 6, | 1903 |
| 1,425,079 | Cone | Aug. 8, | 1922 |
| 1,493,014 | Boyle | May 6, | 1924 |
| 1,795,564 | Korge | Mar. 10, | 1931 |
| 1,810,212 | Hinds | June 16, | 1931 |
| 2,158,867 | Schwabacher | May 16, | 1939 |
| 2,516,609 | Woodard | July 25, | 1950 |
| 2,538,580 | Meaker | Jan. 16, | 1951 |
| 2,545,208 | Meaker | Mar. 13, | 1951 |
| 2,600,485 | Cox | June 17, | 1952 |
| 2,756,317 | Dresser | July 24, | 1956 |
| 2,763,759 | Mito et al. | Sept. 18, | 1956 |
| 2,879,367 | McLean | Mar. 24, | 1959 |
| 2,892,973 | Straughan | June 30, | 1959 |
| 2,963,538 | Dahlgren | Dec. 6, | 1960 |
| 3,106,502 | Starger et al. | Oct. 8, | 1963 |

FOREIGN PATENTS

| | | | |
|---|---|---|---|
| 952,937 | Germany | Nov. 22, | 1956 |